US006242082B1

(12) United States Patent
Mukoyoshi et al.

(10) Patent No.: US 6,242,082 B1
(45) Date of Patent: Jun. 5, 2001

(54) INK JET RECORDING SHEET

(75) Inventors: Shunichiro Mukoyoshi, Ichikawa; Shinichi Asano, Tokyo; Masahiro Morie; Masami Kubota, both of Chiba, all of (JP)

(73) Assignee: Oji Paper Co., Ltd., Tokyo (JP)

( * ) Notice: Subject to any disclaimer, the term of this patent is extended or adjusted under 35 U.S.C. 154(b) by 0 days.

(21) Appl. No.: 09/158,533

(22) Filed: Sep. 23, 1998

(30) Foreign Application Priority Data

Sep. 25, 1997 (JP) .................................................. 9-259924

(51) Int. Cl.[7] ........................................................ B32B 7/02

(52) U.S. Cl. ........................ 428/212; 428/211; 428/537.5

(58) Field of Search .................................... 428/195, 207, 428/211, 327, 329, 331, 341, 342, 212, 537.5

(56) References Cited

U.S. PATENT DOCUMENTS

| | | | |
|---|---|---|---|
| 4,048,380 | 9/1977 | Blakey et al. . | |
| 5,275,846 | 1/1994 | Imai et al. . | |
| 5,302,576 | 4/1994 | Tokiyoshi et al. . | |
| 5,576,088 * | 11/1996 | Ogawa et al. ....................... | 428/327 |

FOREIGN PATENT DOCUMENTS

| | | | |
|---|---|---|---|
| 0 602 400 | 6/1994 | (EP) . | |
| 0 634 283 | 1/1995 | (EP) . | |
| 0 685 344 | 12/1995 | (EP) . | |
| 0 705 704 | 4/1996 | (EP) . | |
| 0 707 977 | 4/1996 | (EP) . | |
| 0 732 219 | 9/1996 | (EP) . | |
| 0 747 230 | 12/1996 | (EP) . | |
| 826510 * | 4/1998 | (EP) ............................... | B41M/5/00 |
| 7-829220 | 4/1995 | (JP) . | |

OTHER PUBLICATIONS

Merriam–Webster's Collegiate Dictionary (10th ed.), p 1073, 1998.*

Japanese Standards Association, "Specular Glossiness—Methods of Measurement", JIS Z 8741–1997, Japanese Industrial Standard, Sep. 20, 1997.

Japanese Standards Association, "Pulps—Determination of Drainability", JIS P 8121–1995, Japanese Industrial Standard, Mar. 1, 1995.

Test for Interfiber Bond Using the Internal Bond Tester, TAPPI Useful Methods, 1991, pp. 66–67.

* cited by examiner

*Primary Examiner*—Bruce H. Hess
*Assistant Examiner*—Michael E. Grendzynsk
(74) *Attorney, Agent, or Firm*—Arent Fox Kintner Plotkin & Kahn, PLLC

(57) ABSTRACT

An ink jet recording sheet having excellent gloss and ink jet recording ability and exhibiting a high resistance to damage (gear or spur marks) of the sheet surface due to contact with sheet-conveying rollers located in a sheet-conveying section of an ink jet printer, includes at least one ink receiving layer formed on a support paper sheet and has a recording surface gloss of 30% or more determined at 75 degree angle in accordance with JIS Z 8741; the support paper sheet has an internal fiber-bonding strength of $100\times10^{-3}$ ft-lb or more, determined in accordance with TAPPI UM 403; and optionally a gloss layer containing a resin is formed on the ink receiving layer.

3 Claims, No Drawings

INK JET RECORDING SHEET

BACKGROUND OF THE INVENTION

1. Field of the Invention

The present invention relates to an ink jet recording sheet having excellent gloss and ink jet recording ability. More particularly, the present invention relates to an ink jet recording sheet having excellent gloss and ink jet recording ability and a high resistance to damage to the front surfaces of the recording sheets by sheet-conveying rollers arranged in a sheet-feeding section of the ink jet printer.

2. Description of the Related Art

The recording by an ink jet printer is advantageous in that the printing noise is low, high speed printing can be done and multi-color printing is easy, and thus ink jet printers are utilized in many fields. As a sheet for the ink jet recording, various woodfree paper sheets having an improved ink-absorbing property and various coated paper sheets having a front coating layer comprising porous pigment particles are used. For example, Japanese Unexamined Patent Publication No. 62-158,084 discloses a process for producing an ink jet recording paper sheet having a front coating layer containing fine porous synthetic silica particles and exhibiting a high ink-absorbing property and a high color density of the printed ink images.

Conventional recording paper sheets are, however, generally low gloss ink jet recording sheets having a mat surface and thus cannot record thereon full colored images having a photographic-image-like tone. Accordingly, an ink jet recording sheets having a high surface gloss and an excellent appearance are currently in demand.

Generally, as a high surface gloss paper sheet, a high gloss coated paper sheet produced by coating a support sheet surface with a plate-crystalline pigment, and optionally calendering the pigment coated surface, or a cast-coated paper sheet produced by bringing a wetted resin coating layer on a support sheet into a contact under pressure with a mirror-finished surface of a heated casting drum and drying the coating layer, to transfer the casting mirror surface to the coating layer, are known.

The cast-coated paper sheet has excellent surface gloss and smoothness and exhibits a superior printing effect in comparison with those of the conventional pigment-coated paper sheet, and thus is employed only for high grade prints. When used for ink jet recording, the cast-coated paper sheet is disadvantageous in various ways.

Generally, the usual cast-coated paper sheet is disclosed in, for example, U.S. Pat. No. 5,275,846. In this case, the cast-coated layer is formed from a composition comprising a pigment and a film-forming substance, for example, a binder. The film-forming substance enables the cast-coated layer to transfer the mirror-finished casting surface to the cast-coated layer, and thus the resultant cast-coated layer has a high gloss. However, the film-forming substance causes the porosity of the cast-coated layer to decrease and thus the resultant cast-coated layer exhibits a very low ink-absorbing property for the ink jet printing. To improve the ink-absorbing property, the porosity of the cast coated layer must be increased so as to enable the cast-coated layer to easily absorb the ink. For this purpose, the content of the film-forming substance in the cast-coated layer must be decreased. When the content of the film-forming substance is decreased, the resultant cast-coated layer exhibits a reduced gloss.

As mentioned above, it is extremely difficult to provide a cast-coated paper sheet satisfactory in both a high surface gloss and a high ink jet printing ability.

As a means for solving the above-mentioned difficulty, European Unexamined Patent Publication No. 634283A discloses an ink jet recording sheet produced by a process in which a support paper sheet surface is coated with an undercoat layer comprising, as principal components, a pigment and a binder; the undercoat layer surface is coated with a coating liquid containing, as a principal component, a composition of a copolymer of ethylenically unsaturated monomers and having a gloss transition temperature of 40° C. or more, to form a coating liquid layer for a cast-coated layer; and the coating liquid layer in a wetted condition is brought into contact under pressure with a mirror-finished surface of a heated casting drum, and dried. By this process, the resultant cast-coated paper sheet has both an excellent gloss and a superior ink-absorbing property, and is useful as an ink jet recording sheet.

The above-mentioned process enables the ink jet recording sheet having excellent surface gloss and ink jet recording aptitude to be produced. However, the resultant ink jet recording sheet having a high gloss, particularly a 75 degree gloss of 30% or more determined in accordance with JIS Z 8741, is disadvantageous in that, when the recording paper sheet is conveyed within the printer, the front surface of the recording sheet is damaged by sheet-conveying-rollers equipped with sheet conveying gears or spurs, and the resultant gear or spur marks on the recording sheet are easily recognized.

Particularly, the current ink jet printers have a fine and precise mechanism and thus can record photographic image-like ink jet images. However, to enhance the sheet-conveying accuracy of the printers, there is such a trend that the number of the gears or spurs attached to the sheet-conveying rollers is increased, and thus the gear or spur marks are formed more easily.

As mentioned above, in the ink jet printer, the printed recording sheet is conveyed by sheet-conveying rollers equipped with sheet-conveying metallic gears or spurs in such a manner that the printed recording sheet, which has been locally swollen with the printing ink and thus has been softened as a whole, is brought into contact under pressure with the metallic gears or spurs, and thus obvious gear or spur marks are formed on the printed recording sheet. Thus, there is a strong demand of solving the gear or spur mark problem on the recording sheet.

SUMMARY OF THE INVENTION

The present invention purposes to provide an ink jet recording sheet having a high ink jet recording aptitude, for example, a high gloss, a high color density of printed images, a high ink-absorbing property and a high image clarity, and a high resistance to formation of sheet-conveying gear or spur marks.

The object of the present invention is attained by the ink jet recording sheet of the present invention which comprises:

a support paper sheet; and one or more ink receiving layers formed on the support paper sheets, an outermost recording surface of the ink receiving layers having a gloss of 30% or more, determined at an angle of 75 degrees in accordance with Japanese Industrial Standard Z 8741, wherein the support paper sheet has an internal pulp fiber-bonding strength of $100\times10^{-3}$ ft-lb or more, determined in accordance with TAPPI UM403.

The internal pulp fiber-bonding strength is referred to as a "Z axis strength" of the paper sheet and determined by an internal fiber-bonding strength tester in accordance with TAPPI UM403.

In the ink jet recording sheet of the present invention, the one or more ink receiving layers preferably contain a pigment and a binder resin, and a gloss layer containing a resin is preferably further formed on an outermost surface of the ink receiving layers.

In the above-mentioned ink jet recording sheet of the present invention, the gloss layer is preferably one formed by coating a coating liquid containing the resin on the ink receiving layers, and, while the resultant coating liquid layer is kept in a wetted condition or after the resultant coating liquid layer is dried and then re-wetted, bringing the wetted coating layer into contact under pressure with a mirror-finished peripheral surface of a heated-casting drum, and then drying the cast coating layer.

In the ink jet recording sheet of the present invention, the support paper sheet preferably contains a pulp having a Canadian standard freeness (CSF, JIS P 8121) of 300 to 450 ml.

In the ink jet recording sheet of the present invention, preferably the support paper sheet contains at least calcined kaolin particles or amorphous silica particles in a content of 1 to 15% by weight.

In the ink jet recording sheet of the present invention, preferably the calcined kaolin particles have an average particle size of 0.5 to 5 $\mu$m and a specific surface area of 5 to 50 $m^2/g$, and the amorphous silica particles have an average particle size of 1 to 50 $\mu$m and a specific surface area of 50 to 300 $m^2/g$.

In the ink jet recording sheet of the present invention, preferably the gloss layer comprises, in addition to the resin, fine amorphous silica secondary particles having an average secondary particle size of 10 to 400 nm and each consisting essentially of a plurality of primary particles agglomerated with each other and having an average primary particle size of 3 to 40 nm.

DESCRIPTION OF THE PREFERRED EMBODIMENTS

The support paper sheet of the ink jet recording sheet of the present invention consists essentially of a paper sheet comprising, as a main component, pulp fibers, for example, wood pulp fibers, and having an internal bonding strength of the pulp fibers, namely a Z-axis strength, of $100\times10^{-3}$ ft-lb or more, preferably $150\times10^{-3}$ ft-lb or more, determined in accordance with TAPPI UM403. The internal pulp-fiber bonding strength (Z axis strength) is represented by an average energy value necessary to separate a paper sheet into two stratums.

In the internal pulp fiber bonding strength of the support paper sheet of the present invention, there is no specific upper limit. However, usually, when the internal pulp fiber bonding strength exceeds $300\times10^{-3}$ ft-lb, the gear or spur mark-preventing effect on the recording sheet is saturated, and the recording sheet may exhibit a degraded resistance to ink-blotting, cockling and curling.

The inventors of the present invention have studied how to decrease the gear or spur marks on the recording sheet and have found that there is a relationships between the intensity of the gear or spur marks and the Z axis strength of the support paper sheet. Namely, it has been found that the intensity of the gear or spur marks formed on the ink jet recording sheet decreases with an increase in the Z axis strength of the support paper sheet of the ink jet recording sheet.

Generally, when the ink jet recording sheet is printed with ink jets, the gear or spur marks are formed by swelling the support paper sheet with the ink penetrated thereinto so as to soften the support paper sheet. However, it is assumed that in the support paper sheet having a high Z axis strength, the pulp fibers are firmly bonded to each other, and thus the support paper sheet has a high resistances to swelling even when the ink penetrates into the sheet, and exhibits a high resistance to gear or spur mark formation.

The support paper sheet usable for the present invention comprises, as a main component, a pulp. The pulp includes chemical pulps, for example, LBKP and NBKP, mechanical pulps, for example, GP and TMP, and waste paper pulps, for example, DIP. The Z axis strength of a paper sheet increases with a decrease in the Canadian standard freeness (CSF) of the pulp from which the paper sheet is produced. However, when the freeness of the pulp is too low, for example, less than 300 ml, the resultant paper sheet may exhibit a decreased resistance to cockling after ink-printing, namely uneven swelling of the paper sheet due to the local absorption of the ink in the paper sheet. Also, the low freeness causes the drainage property of the resultant pulp slurry to decrease and thus the productivity of the paper from the pulp slurry decreases. Further, the low freeness of the pulps causes the resultant paper sheet to exhibit an increased difficulty in control of the curling property of the paper sheet, and a decreased permeance, namely an increased air resistance, which air resistance is represented by a time within which a fixed amount of air passes through a fixed area of the paper sheet. The decreased permeance causes, when the paper sheet is coated with an aqueous coating liquid and dried, the generated water vapor to be difficult to escape through the paper sheet, the resultant dried sheet is roughened and the efficiency of the coating procedure significantly decreases.

The pulp usable for the support paper sheet of the present invention preferably has a Canadian standard freeness (CSF) of 300 to 450 ml, more preferably 350 to 440 ml, determined in accordance with Japanese Industrial Standard (JIS) P 8121. The reasons for the specifically limited freeness are as follows.

When the freeness is 450 ml or less, the pulp is softened and fibrillated, and the resultant paper sheet has a high internal pulp fiber-bonding strength, and thus when the ink jets penetrate into the paper sheet, the paper sheet exhibits a high resistance to swelling with the ink. Thus, no gear or spur marks are formed on the paper sheet even when the paper sheet is pressed with the gears or spurs. When the freeness is less than 300 ml, the resultant paper sheet exhibits a poor resistance to cockling by the ink, namely to roughening of the paper sheet due to uneven swelling with the ink. Also, the pulp having the freeness less than 300 ml exhibits a poor drainage property, and thus the paper-forming procedure from the pulp may have a very low efficiency, and the control of the curl-formation on the resultant paper sheet may be difficult. Further, since the low freeness causes the resultant paper sheet to exhibit a reduced permeance, when the coating is carried out by a cast-coating method, the water in the cast-coated liquid layer may be difficult to remove, the resultant cast-coated paper sheet may be roughened, the cast-coating procedure may exhibit a low efficiency, and the cast coating speed may decrease.

The freeness of the pulp can be adjusted by controlling the beating procedure. The beating refers to a mechanical procedure by which the pulp fibers are softened and fibrillated (namely, the surface and inside portions of the pulp fibers are unbound into fine fibrils), and the internal pulp fiber-bonding strength of the resultant paper sheet is enhanced. Usually, the beating procedure is carried out by using a beating machine, for example, a beater, a Jordan beater, a conical type refiner, a drum-type refiner, or a disk-type refiner. Namely, the freeness of the pulp can be controlled by an amount of energy consumed by the beating marchine. Generally, the larger the energy amount applied to beating procedure, the lower the freeness (CSF) of the resultant pulp.

The material for forming the support paper sheet optionally comprises, in addition to the pulp, at least one member selected from pigments (fillers), binders, sizing agents, fixing agents, yield-enhancing agents, cationic agents, paper strengthening agents, dyes and fluorescent brightness.

The pigments usable for the support paper sheet of the present invention are selected from, for example, amorphous silica, calcined kaolin, calcium carbonate and titanium dioxide and are used for the purpose of imparting an opaqueness, preventing the permeation of the ink to the back surface of the recording sheet and enhancing the ink-absorbing property of the support paper sheet. For the purpose of enhancing the ink absorbing property, the amorphous silica and the calcined kaolin are preferably employed. Particularly, the amorphous silica is preferably selected from those having an average particle size of 1 to 50 $\mu$m and a specific surface area of 50 to 300 $m^2/g$ and the calcined kaolin is preferably selected from those having an average particle size of 0.5 to 5 $\mu$m and a specific surface area of 5 to 50 $m^2/g$.

In the ink jet recording sheet of the present invention, when the content of the pigment in the support paper sheet is too high, the interlaminar strength of the recording sheet may tend to decrease. Also, when the content of the pigment is too low, the resultant support paper sheet may exhibit a reduced ink-absorbing property, thus the printed ink images may blot and may be formed unevenly, and the ink permeation to the back surface of the support paper sheet through the support paper sheet may become apparent, while the interlaminar strength of the resultant sheet may be enhanced, the swelling of the paper sheet with the ink may be restricted and the gear or spur mark-formation may be prevented. Therefore, in the support paper sheet usable for the present invention, the content of the pigment should be carefully controlled.

The content of the pigment is established in response to the type of the pigment. When the pigment is selected from silica or calcined kaolin, the pigment in the support paper sheet is preferably employed in a content of 1 to 15%, more preferably 2 to 8%, by weight based on the total dry weight of the support paper sheet.

The content of the pigment in the support paper sheet can be determined by measuring the ash-content of the support paper sheet.

The support paper sheet usable for the present invention is optionally coated or impregnated with at least one members selected from starches, polyvinyl alcohols and cationic resins by, for example, a size-press method, to enhance the surface strength of the support paper sheet or to control the permeability of the coating liquid for the ink receiving layer through the support paper sheet. Also, the paper sheet for the support is optionally calendered to smooth the support paper sheet surface, and to enhance the uniformity of the ink receiving layer formed on the support paper sheet.

By sizing the paper sheet for the support with a sizing agent or forming a barrier layer on the paper sheet, the penetration of the ink through the support paper sheet and the swelling the support paper sheet can be controlled. However, when the sizing is applied to too much an extent these surface treatments may cause the ink-absorbing rate and capacity of the support paper sheet to reduce and thus the printed ink images to blot or to be uneven in color density and thus to exhibit a poor image quality.

When the paper sheet for the support has a standard basis weight of 100 $g/m^2$, the degree of sizing is preferably 1 to 100 seconds, more preferably 2 to 50 seconds.

As mentioned above, generally, there is a tendency that the lower the freeness of the pulp and the lower the content of the pigment contained in the paper sheet during the paper-forming procedure, the higher the Z axis strength of the paper sheet. Also, the Z axis strength can be enhanced by adding a paper-strengthening agent to the paper sheet. The paper strengthening agent preferably comprises at least one member selected from starches, cationic starches, vegetable gums, polyacrylamide resins, and polyamide-epichlorohydrin resins. Further, the interlaminar strength of the paper sheet can be improved by applying, for example, a size-press treatment with a polymeric substance, for example, at least one member selected from starches and polyvinylalcohols to a surface of the paper sheet.

The ink receiving layers on the support paper sheet will be explained in detail below.

The ink receiving layer contains a pigment and a binder. The ink receiving layer per se may be subjected to a gloss-enhancing treatment, for example, a cast-finishing treatment or a calendering treatment. Otherwise, a gloss layer comprising, as a main component, a resin and, optionally, a pigment is formed on the ink receiving layer.

The pigment usable for the ink receiving layer preferably comprises at least one member selected from amorphous silica, including colloidal silica, zeolites, kaolin, clay, calcined clay, zinc oxide, aluminum oxide, aluminum hydroxide, calcium carbonate, satin white, aluminum silicate, sepiolites, smectites, synthetic smectites, hydrotalcites, magnesium silicate, magnesium carbonate, magnesium oxide, diatomaceous earth, styrene polymer pigments, urea resin pigments, and benzoguanamine resin pigments, which are usable for conventional coated paper sheets. These pigments may be employed alone or in a mixture of two or more thereof.

Preferably, the amorphous silica, zeolite and aluminum oxide are preferably employed for the ink receiving layer of the present invention, because these pigments contribute to enhancing the ink-absorbing property of the resultant ink receiving layer. More preferably, the ink receiving layer contains the amorphous silica as a principal component of the pigment. The amorphous silica is preferably selected from synthetic amorphous silica pigments. The synthetic amorphous silica pigments are briefly classified, in accordance with the production processes thereof, into ones produced by a wet process and ones produced by a dry process. In the wet processes for producing the amorphous silica pigments, sodium silicate is used as a starting material, and is neutralized with an acid to cause the resultant silica to precipitate. The wet processes are classified into a precipitating process and a gelling process.

Also, in the dry processes for producing the amorphous silica pigments, silicon tetrachloride is used as a starting material and is burnt together with hydrogen and oxygen, to cause the amorphous silica to be produced. The amorphous silica pigments produced by the dry processes are referred to as white carbon and include silicic acid anhydride and hydrated silicic acid.

The above-mentioned synthetic amorphous silica pigment preferably has an average secondary particle size of 0.5 to 20 $\mu$m. Also, for the purpose of absorbing the ink, the synthetic amorphous silica pigment preferably has a high oil absorption and a BET specific surface area. However, when the oil absorption and/or the specific surface area is too high, the resultant coating liquid for the ink receiving layers may have too high a viscosity. Therefore, the synthetic amorphous silica pigment preferably has an oil absorption of 100 to 400 ml/100 g and a BET specific surface area of 100 to 500 $m^2/g$.

The binder usable for the ink receiving layers preferably comprises at least one member selected from proteins, for example, casein, soybean protein and synthetic proteins; starch compounds, for example, starches and oxidized starches; polyvinyl alcohols; polyvinyl alcohol derivatives, for example, silyl-modified polyvinyl alcohols and cation-modified polyvinyl alcohols, cellulose derivatives, for example, carboxymethylcellulose and methylcellulose; latices of conjugated diene polymers, for example, styrene-butadiene copolymers and methyl methacrylate-butadiene copolymers; and latices of vinyl polymers, for example, ethylene-vinyl acetate copolymers, which are widely used for conventional coated paper sheets. These binder compounds are used alone or in a mixture of two or more thereof.

There is no limitation to the content of the binder in the ink receiving layers. Usually, the binder is preferably contained in an amount of 1 to 100 parts by weight, more preferably 2 to 50 parts by weight, per 100 parts by weight of the pigment. When the content of the binder is too low, the resultant ink receiving layer may exhibit an unsatisfactory mechanical strength, the surface of the ink receiving layer may be easily damaged, and a powdering phenomenon may occur on the ink receiving layer. Also, when the content of the binder is too high, the resultant ink receiving layer may exhibit an unsatisfactory ink-absorbing property and thus the desired ink jet recording aptitude may not be obtained.

In the ink jet recording sheet of the present invention, a cationic compound is optionally contained in the ink receiving layer to fix a dye component contained in the ink and to enhance the color density and the water resistance of the printed ink images.

The cationic compounds usable for the present invention include cationic polymers (resins) and low molecular weight cationic compounds, for example, cationic surfactant compounds. To enhance the color density of the printed ink images, the cationic resins are preferred. The cationic resins are employed in the state of an aqueous solution or emulsion. Also, the cationic resin may be insolubilized by, for example, cross-linking, and the resultant insolubilized cationic resin may be used as a cationic organic pigment in the form of fine solid particles. The organic cationic pigment is produced, for example, by copolymerizing polyfunctional cationic monomers into a cross-linked cationic copolymer, or by mixing a cationic resin having reactive functional groups, for example, hydroxyl, carboxyl, amino and/or acetacetyl groups, optionally with a cross-linking agent, and reacting the cationic resin with the cross-linking agent by heating or applying radiation, into a cross-linked cationic resin. The cationic compound, particularly the cationic resin may serve as a binder.

The cationic resins usable for the present invention include:

(1) polyalkylenepolyamines, for example, polyethylenepolyamine and polypropylenepolyamine, and derivatives thereof;

(2) acrylic resins having a secondary amino group, tertiary amino group and/or quaternary ammonium group;

(3) polyvinylamines and polyvinylamidines;

(4) cationic dicyan resins, for example, dicyandiamide-formaldehyde polycondensation products;

(5) cationic polyamine resins, for example, dicyandiamide-diethylenetriamine polycondensation products;

(6) epichlorohydrin-dimethylamine addition-polymerization products;

(7) dimethyldiallyl ammonium chloride-$SO_2$ copolymers;

(8) diallylamine-$SO_2$ copolymers;

(9) dimethylallyl ammonium chloride polymers;

(10) allylamine polymers;

(11) dialkylaminoethyl (meth)acrylate quaternary salt polymers; and

(12) acrylamide-diallylamine salt copolymers.

The cationic compound is preferably contained in an amount of 1 to 100 parts by weight, more preferably 5 to 50 parts by weight, per 100 parts by weight of the pigment, in the ink receiving layers. When the content of the cationic compound in the ink receiving layers is too low, the color density-enhancing effect for the printed ink images may be unsatisfactory. Also, the cationic compound content is too high, the color density of the printed ink images may decrease and the ink images may be blotted.

The ink receiving layers of the present invention optionally contain at least one additive selected, for example, from dispersing agents, thickening agents, antifoaming agent, coloring materials, antistatic agents, and preservatives.

The coating liquid for the ink receiving layers containing the above-mentioned components is prepared in a dry solid content of 5 to 65% by weight and coated on a surface of a support paper sheet preferably having a basis weight of about 20 to about 400 $g/m^2$ and dried to form at least one ink receiving layer preferably having a dry solid weight of 1 to 50 $g/m^2$, more preferably 2 to 20 $g/m^2$. For the coating, a conventional coating device, for example, blade coater, air knife coater, roll coater, brush coater, Champlex coater, bar coater or gravure coater. After drying, the ink receiving layer surface is optionally smoothed by a conventional smoothing procedure, for example, a calendering, super calendering or brushing treatment.

In the ink jet recording sheet of the present invention, a gloss layer is optionally formed on the ink receiving layers containing as principal components, a pigment and a binder. The gloss layer comprises a resin (binder) and optionally a pigment. The gloss layer is preferably porous or liquid-permeable so that the ink can rapidly pass therethrough, unless the gloss is degraded. For this purpose, it is preferable that a pigment be mixed with the resin for the gloss layer, or the resin-containing liquid layer for the gloss layer be carried out under such a drying condition that the resin forms an incomplete film, unless the gloss is degraded.

Where the pigment is contained in the gloss layer, the pigment may be selected from the same group as mentioned above for the ink receiving layers. Since a high gloss, transparency and ink-absorbing property can be obtained, the colloidal silica, amorphous silica, aluminum oxide, zeolites, and synthetic smectites are preferably employed for the gloss layer. The pigment contained in the gloss layer preferably has an average particle size of 0.01 to 5 $\mu$m, more preferably 0.05 to 1 $\mu$m. When the average particle size is less than 0.01 $\mu$m, the resultant pigment may exhibit an unsatisfactory ink absorbing property-enhancing effect. Also, if the average particle size is more than 5 $\mu$m, the resultant gloss layer may exhibit unsatisfactory gloss and color density of the printed ink images.

In the gloss layer of the present invention, when, as a pigment, fine silica particles having an average primary particle size of 3 nm to 40 nm and an average secondary particle size of 10 nm to 400 nm are used, the resultant gloss layer exhibits an enhanced gloss and ink-absorbing property. The average secondary particle size of the silica particles is preferably 10 nm to 300 nm. When the gloss layer contains the pigment, as a principal component, in a content of 40 to 90% by weight, particularly 50 to 90% by weight, the silica particles having the above-mentioned specific particle sizes are preferably employed.

In this case, since the resultant gloss layer has an excellent ink-absorbing property and gloss, when a cationic compound is contained in the gloss layer, the ink dye can be fixed in the gloss layer with a high efficiency and thus the color density of the fixed dye images can be enhanced with contribution of the high transparency of the gloss layer.

The resin usable for the gloss layer may be selected from organic polymeric substances, particularly, polyvinyl alcohol compounds including polyvinyl alcohols and derivatives thereof, for example, silyl-modified polyvinyl alcohols and cation-modified polyvinyl alcohols, aqueous urethane resins, and polymers produced by polymerizing ethylenically unsaturated monomers. The aqueous urethane resins can be produced by reacting an isocyanate compound, for example, diisocyanate, triisocyanate or tetraisocyanate, with a polyol compound. Particularly, the polymer composition produced by polymerizing a monomer having at least one ethylenically unsaturated bond, namely an ethylenically unsaturated monomer, is advantageously employed for the gloss layer. This type of polymer can be produced by polymerizing at least one ethylenically unsaturated monomer, selected from acrylate esters having a hydrocarbon group having 1 to 18 carbon atoms, for example, methyl acrylate, ethyl acrylate, butyl acrylate, 2-ethylhexyl acrylate, lauryl acrylate, 2-hydroxyethyl acrylate, and glycidyl acrylate; methacrylate esters having a hydrocarbon group having 1 to 18 carbon atoms, for example, methyl methacrylate, ethyl methacrylate, 2-hydroxyethyl methacrylate, 2-hydroxypropyl methacrylate and glycidyl methacrylate; and for example, styrene, $\alpha$-methylstyrene, vinyl toluene, acrylonitrile, vinyl chloride, vinylidene chloride, vinyl acetate, vinyl propionate, acrylamide, N-methylol acrylamide, ethylene, butadiene, acrylic acid and methacrylic acid.

The above-mentioned polymers may be copolymers of two or more ethylenically unsaturated monomers, or substituted derivatives of the homo-polymers and copolymers of the ethylenically unsaturated monomers. Also, the polymers may be in the form of a composite compound produced by polymerizing the ethylenically unsaturated monomers in the presence of colloidal silica to allow the resultant polymer to bond the silica through a bond of the formula: Si—O—R wherein R represents a polymer residue, or in the form of a complex produced by a reaction of a polymer having functional groups, for example, SiOH groups which are reactive with the colloidal silica, with the colloidal silica. When the above-mentioned composite or complex polymer compound is used, the gloss and ink-absorbing property of the gloss layer are further enhanced. Also, when the gloss layer is formed by a cast-coating method which will be explained later, the above-mentioned composite or complex polymer compound enhances the releasing property of the resultant gloss layer from the casting surface.

There is no limitation to the particle size of the composite or complex polymer compound. Usually, the average particle size is 30 nm to 150 nm.

The above-mentioned polymers composition preferably exhibits a glass transition temperature of 40° C. or more, more preferably 50 to 100° C. When the glass transition temperature of the polymer composition is too low, the polymer composition may cause the film formation from the coating liquid for the gloss layer containing the polymer composition to excessively progress, and the resultant gloss layer may have a reduced porosity and thus and may exhibit a decreased ink-absorbing rate. Also, the drying condition, for example, drying temperature, for the gloss layer formation should be controlled to obtain the target gloss layer. When the drying temperature is too high, the film formation may excessively progress, the resultant gloss layer may have a reduced porosity and an unsatisfactory ink-absorbing property. When the drying temperature is too low, the gloss of the resultant gloss layer may be unsatisfactory and an economical disadvantage in productivity may occur.

The gloss layer can be formed by coating a surface of the ink-receiving layers or directly a surface of the support with a coating liquid containing, as a principal component, a resin and optionally a pigment, drying the coated coating liquid layer, and smoothing the resultant dried resin layer surface by a super calender. Preferably, the gloss layer is formed by a wet casting method in which a surface of the ink receiving layers or of the support paper sheet is coated with a coating liquid containing, as a principal component, a resin and optionally a pigment; the coating liquid layer is brought, while the layer is kept in the wetted condition, into contact under pressure with a mirror-finished casting surface of a heated casting drum; the coating liquid layer is dried; and then the dried gloss layer is separated from the casting drum surface. Otherwise, the gloss layer is formed by a re-wet casting method in which the coating liquid layer formed on the ink receiving layers or directly on the support in the same manner as mentioned above is dried; the dried coating layer is rewetted with an aqueous rewetting liquid; the rewetted coating layer is brought into a mirror-finished casting surface of a heated casting drum and dried; and then the resultant gloss layer is separated from the casting drum surface. The wet casting method and the re-wet casting method are preferred to produce the ink jet recording sheet of the present invention having an excellent gloss and ink-absorbing property. The casting surface of the casting drum is preferably heated to a temperature of 50 to 150° C., more preferably 70 to 120° C.

The gloss layer may be formed by a pre-cast method in which a coating liquid comprising a resin and optionally a pigment is directly coated on a mirror-finished casting surface of a heated casting drum; and the resultant coating liquid layer is brought, while the coating layer is kept in the wetted condition, into contact under pressure with a surface of at least one ink receiving layer formed on a support paper sheet and dried, to bond the resultant gloss layer to the ink receiving layer.

Alternatively, the gloss layer is formed by a film transition method in which a coating liquid containing a resin and optionally a pigment is coated on a casting surface of a smooth film or sheet; the resultant coating layer is brought into contact under pressure with a surface of at least one ink receiving layer formed on a support paper sheet, while the coating layer and/or the ink receiving layer are in the wetted condition, and is dried to form a gloss layer; and the gloss layer is separated from the casting surface of the casting film or sheet.

Otherwise, a single coating layer may serve as a gloss layer and as an ink receiving layer.

The coating liquid for the gloss layer optionally contains at least one additive selected from conventional pigments, anti-foaming agents, coloring materials, anti-static agents, preservatives, dispersing agents, and thickening agents which are widely used for conventional coated paper sheets for printing, to control the whiteness, viscosity and fluidity of the coating liquid. Also, a cationic compound is optionally added to the gloss layer to enhance the ink-fixing property of the gloss layer.

To coat the coating liquid for the gloss layer on the ink receiving layer surface, a conventional coating device, for example, a blade coater, air knife coater, roll coater, brush coater, Champlex coater, bar coater or gravure coater can be employed. Thereafter, as mentioned above, the coating liquid layer may be brought into contact under pressure with a mirror-finished casting surface of a heated casting drum, while the coating liquid layer is kept in the wetted condition, or after the coating liquid layer is dried and re-wetted; and then dried, to form a gloss layer having a high gloss and smoothness.

In this case, the coating liquid for the gloss layer is preferably coated in a dry solid amount of 0.2 to 30 g/m$^2$, more preferably 1 to 10 g/m$^2$. When the dry solid amount of the coating liquid layer is less than 0.2 g/m$^2$, the resultant gloss layer may have an unsatisfactory gloss. Also, when the coating liquid is coated in a dry solid amount more than 30 g/m$^2$, the resultant gloss layer may exhibit an unsatisfactory ink-drying property and the color density of the printed ink images may be unsatisfactory.

After the gloss layer is formed, a surface-smoothing treatment with a super calender may be further applied to the gloss layer.

In the present invention, an ink jet recording sheet having an excellent gloss can be obtained. The recording surface of the ink jet recording sheet has a gloss of 30% or more determined at an angle of 75 degree in accordance with JIS Z 8741. Therefore, the ink jet recording sheet of the present invention can record thereon photographic image-like ink images having a high quality.

The gloss at the 75 degree angle of the ink jet recording sheet of the present invention is preferably 40% or more, more preferably 65% or more. There is no specific upper limit to the gloss. For example, the gloss can be 95%.

EXAMPLES

The present invention will be further illustrated by the following examples which are merely representative and do not intend to limit the scope of the present invention in any way.

In the examples and comparative examples, the "part" and "%" are based on weight, unless specifically shown otherwise.

Examples 1 to 9 and Comparative Examples 1 and 2

In each of Examples 1 to 9 and Comparative Examples 1 and 2, a paper sheet having a basis weight of 100 g/m$^2$ was produced from an aqueous pulp slurry containing 100 parts of a hardwood kraft pulp, a calcined kaolin having an average particle size of 1 μm and a specific surface area of 18 m$^2$/g, (trademark: ANSILEX, made by ENGELHARD MINERAL CO.) in an amount of 0 to 30 parts as shown in Table 1, 0.2 part of a trade fortified rosin sizing agent, 0.75 part of tapioca starch, 0.5 part of a wet paper strengthening agent and 1.5 parts of aluminum sulfate. The hardwood kraft pulp used in each of the examples and comparative examples had the Canadian standard freeness (CSF) as shown in Table 1 and determined in accordance with JIS P 8121. Also, the calcined kaolin was employed in the amount resulting in the ash content of the resultant paper sheet as shown in Table 1.

Separately, an aqueous coating liquid having a dry solid content of 18% for an ink-receiving layer was prepared from 100 parts of an amorphous silica pigment (trademark: FINESIL X-45, made by TOKUYAMA K.K.) having a specific surface area of 340 m$^2$/g, an average secondary particle size of 4.5 μm and an average primary particle size of 15 nm, 25 parts of a binder consisting of a silyl-modified polyvinyl alcohol (trademark: R 1130, made by KURARAY CO., LTD.), a cationic resin consisting of 5 parts of a dicyandiamide resin (trademark: NEOFIX E-117, made by NIKKA CHEMICAL CO., LTD.) and 15 parts of a cationic acrylamide resin (trademark: SUMIREZ RESIN SR 1001, made by SUMITOMO CHEMICAL CO., LTD.) and 0.5 part of a dispersing agent consisting of sodium polyphosphate.

The coating liquid was coated on a surface of the paper sheet for the support by using an air knife coater and dried to form an ink receiving layer having a dry weight of 6 g/m$^2$.

Separately, an aqueous coating liquid having a dry solid content of 25% for a gloss layer was prepared from 100 parts of a copolymer-colloidal silica composite prepared from a styrene-2-methyl-hexyl acrylate copolymer having a glass transition temperature of 75° C. and reacted with a colloidal silica having a particle size of 30 nm in a weight ratio of 50:50, the composite having an average particle size of 80 nm, 5 parts of a thickening and dispersing agent consisting of an alkyl-vinyl ether-maleic acid derivative copolymer, and 2 parts of a releasing agent consisting of lecithin.

The coating liquid for the gloss layer was coated on the above-mentioned ink receiving layer surface by using a roll coater, and immediately the coating liquid layer was brought into contact under pressure with a mirror-finished casting surface of a casting drum heated at a temperature of 80° C. and dried to form a gloss layer having a dry solid weight of 6 g/m$^2$. Thereafter, the resultant gloss layer was separated from the casting surface of the drum. A high gloss ink jet recording sheet was obtained.

Example 10

A paper sheet having a basis weight of 100 g/m$^2$ for a support was produced from an aqueous pulp slurry comprising 100 parts of a hardwood kraft pulp having a CSF of 420 ml, 4 parts of an amorphous silica pigment (trademark: TOKUSIL GUN, made by TOKUYAMA CORP.) having an average secondary particle size of 10 μm and a specific surface area of 190 m$^2$/g, 0.2 part of a trade sizing agent, 0.75 part of tapioca starch, 0.5 part of a wet paper strengthening agent and 1.5 parts of aluminum sulfate. The resultant paper sheet had an ash content of 3%.

The paper sheet for the support was coated with the same ink receiving layer and the same gloss layer as in Example 1 in the same manner as in Example 1.

A high gloss ink jet recording sheet was obtained.

Example 11

A surface of the same paper sheet as that used in Example 5 was coated with a coating liquid for an ink receiving layer, prepared by the procedure as shown below, by using an air knife coater, to form an ink receiving layer having a dry weight of 12 g/m$^2$.

Next, a coating liquid for a gloss layer prepared by the procedure as shown below was coated on the surface of the ink receiving layer by using an air knife coater, the resultant coating liquid layer was semi-dried with cold air blast for 20 seconds into a water content of 150% based on the bone-dry weight of the coating liquid layer, then was brought into contact under pressure with a mirror-finished casting surface of a casting drum heated to a surface temperature of 100° C. and was dried to form a gloss layer, and then the resultant gloss layer was separated from the casting surface. A high gloss ink jet recording sheet was obtained. In this recording sheet, the gloss layer had a dry solid weight of 5 g/m$^2$.

Preparation of Coating Liquid having a Dry Solid Content of 17% for Ink Receiving Layer An aqueous coating liquid having a dry solid content of 17% for an ink receiving layer was prepared from 80 parts of a synthetic amorphous silica (trademark: FINESIL X-60, made by TOKUYAMA CORP.) having a specific surface area of 290 m$^2$/g an average secondary particle size of 6.0 μm, and average primary particle size of 15 nm, 20 parts of zeolite (trademark: TOYOBUILDER, made by TOSO K.K.) having an average particle size of 1.5 μm 20 parts of a silyl-modified polyvinyl alcohol (trademark: R 1130, made by KURARAY CO., LTD.) and 40 parts of a copolymer-colloidal silica composite produced from a styrene-2-methylhexyl acrylate copolymer having a glass transition temperature of 75° C. and reacted with a colloidal silica having a particle size of 30 nm in a weight ratio of 40:60. The copolymer-colloidal silica composite is in the form of an aqueous emulsion and the emulsion particle size was 80 nm.

Preparation of Coating Liquid having a Dry Solid Content of 12% for Gloss Layer

An aqueous coating liquid having a dry solid content of 12% for a gloss layer was prepared from 100 parts of silica particle A prepared by the procedures as shown below, 10 parts of a diallyldimethyl ammonium chloride-acrylamide copolymer (trademark: PAS-J-81, made by NITTO BOSEKI CO., LTD.), 20 parts of a cationic acrylic resin (an aqueous quaternary amine-modified acrylic resin, (trademark: XC-2010, made by SEIKO CHEMICAL CO.) having a glass transition temperature (Tg) of 85° C., 10 parts of a silyl-modified polyvinyl alcohol (trademark: R1130, made by KURARAY CO., LTD.) and 2 parts of a releasing agent consisting of lecithin.

Preparation of Fine Silica Particle A

An aqueous dispersion of synthetic amorphous silica particles (trademark: FINESIL X-45, made by TOKUYAMA CORP.) having an average secondary particle size of 4.5 μm and an average primary particle size of 15 nm was subjected to repeated pulverize-dispersing treatment using a pressure type homogenizer (trademark: SUPER HIGH PRESSURE HOMOGENIZER GM-1, made by SMT CO.) under a pressure of 500 kg/cm$^2$. After the treatment, the resultant aqueous amorphous silica dispersion had a solid content of 12% and an average secondary particle size of 50 nm.

Comparative Example 3

An aqueous coating liquid having a dry solid content of 18% for an ink receiving layer was prepared from 100 parts of an amorphous silica (trademark: FINESIL X-45, made by TOKUYAMA CORP.) having an average particle size of 4.5 μm, 25 parts of a silyl-modified polyvinyl alcohol (trademark: R 1130, made by KURARAY CO., LTD.), a cationic resin consisting of 5 parts a dicyandiamide resin (trademark: NEOFIX E-117, made by NIKKA CHEMICAL CO.) and 15 parts of a cationic acrylamide resin (trademark: SUMIREZ RESIN SR1001, made by SUMITOMO CHEMICAL CO., LTD.), and 0.5 part of a dispersing agent consisting of sodium polyphospholate. The aqueous coating liquid for the ink receiving layer was coated on a surface of the same paper sheet as used in Example 5 by using an air knife coater and dried to form an ink receiving layer having a dry weight of 8 g/m$^2$. No gloss layer was formed.

A comparative ink jet recording sheet was obtained.

Comparative Example 4

The same base paper sheet having a basis weight of 100 g/m$^2$ as that prepared in Example 5 was subjected, as a comparative ink jet recording sheet, to the tests described below.

Comparative Example 5

A trade high gloss ink jet recording film (trademark: HG 101, made by CANON CO.) was subjected to the tests described below.

TESTS

The ink jet recording sheet prepared in each of the examples and comparative examples was subjected to the following ink jet recording ability test, white paper gloss test, and ink image storability test.

(1) Z axis strength (internal fiber-bonding strength) test

A paper sheet sample was subjected to an internal fiber-bonding strength test using a Sisalkraft-SCOTT INTERNAL BOND TESTER MODEL-B in accordance with TAPPI UM 403, to separate the paper sheet into two plies in the machine direction.

The internal fiber-bonding strength is represented by an average internal bonding energy required to separate the paper sheet into two plies.

(2) Ink jet recording ability test

An ink jet recording sheet sample was printed by an ink jet printer (trademark: INK JET PRINTER PM 700C, made by SEIKO EPSON CO.).

(i) uniformity of solid printed images

A solid print was prepared by superposing a cyan-colored ink and a magenta-colored ink, and the uniformity in color density and hue of the solid print was evaluated by the naked eye as follows.

| Class | Uniformity of solid print |
|---|---|
| 3 | Substantially uniform and satisfactory in practical use |
| 2 | Uneven, and unsatisfactory in practical use |
| 1 | Apparently uneven<br>Not permissible for practical use |

(ii) Blotting of ink

A solid cyan-colored image and a solid magenta-colored image were printed in such a manner that edges of the solid images come into contact with each other, and the diffusion of the cyan-colored ink and the magenta-colored ink into each other was evaluated by the naked eye as follows.

| Class | Ink-diffusion |
|---|---|
| 3 | Substantially no ink-diffusion is found |
| 2 | Slight ink-diffusion permissible for practical use is found |
| 1 | Apparent ink-diffusion not permissible for practical use is found |

(iii) Ink-drying property

Ink-drying property of a solid print prepared by superposing a cyan-colored ink and a magenta-colored ink on an ink jet recording sheet was evaluated, immediately after the printing, by touching with the finger, as follows.

| Class | Ink-soiling of finger immediately after printing |
|---|---|
| 2 | No soil is found on the touched finger, and ink-drying property is good |
| 1 | Apparent soil is found on the touched finger, and ink-drying property is bad |

(iv) Water resistance of printed ink image

An ink jet recording sheet was printed with black, cyan, magenta and yellow-colored ink images, and each of the colored ink images was wetted with three drops of water. One minute after the wetting, the blotting of the images was evaluated by the naked eye, as follows.

| Class | Ink-blotting |
|---|---|
| 2 | Substantially no change of ink images occurs |
| 1 | Ink images blurred |

(v) Color density of ink jet-recorded images

A black-colored solid image was printed on an ink jet recording sheet, and the color density of the printed image was measured by Macbeth Color Density Meter RD-914 made by MACBETH CO.

(vi) Resistance to spur-marks

The whole surface of an A4-size ink jet recording sheet was solid printed by superposing a cyan-colored ink and a magent-colored ink, and the resultant spur marks are evaluated by the naked eye, as follows.

| Class | Spur-marks |
|---|---|
| 5 | Substantially no spur-marks are found |
| 4 | Slight spur-marks are found |
| 3 | Practically permissible spur-marks are found |
| 2 | Apparent spur marks are found and practical use is difficult |
| 1 | Very apparent spur marks are found |

(3) Cockling resistance test

The whole surface of an A4-size ink jet recording sheet was soild printed by superposing a cyan-colored ink and a magent-colored ink, and cockling of the sheet (wrinkling of the sheet due to printing) was evaluated by the naked eye, as follows.

| Class | Cockling |
|---|---|
| 3 | Substantially no noticeable cockling occurs |
| 2 | Practically permissible, noticeable cockling occurs |
| 1 | Apparent cockling occurs |

(4) White sheet gloss test

A white sheet gloss of an ink jet recording sheet was measured at an angle of 75 degrees in accordance with JIS P 8142.

The test results are shown in Table 1.

TABLE 1

| | Item | | | | | | | | | | |
|---|---|---|---|---|---|---|---|---|---|---|---|
| Example No. | Z axis strength $\times 10^{-3}$ (ft-lb) | Pulp freeness of support paper sheet (CSF) | Ash content of support paper sheet (%) | Uniformity of solid print | Ink blotting | Ink drying property | Water resistance of ink images | Color density of ink images | Resistance to spur marks | Resistance to cockling | Gloss |
| Example | | | | | | | | | | | |
| 1 | 280 | 280 | 13 | 3 | 2 | 2 | 2 | 2.00 | 5 | 2 | 75 |
| 2 | 190 | 350 | 13 | 3 | 3 | 2 | 2 | 2.00 | 5 | 3 | 75 |
| 3 | 260 | 420 | 0 | 3 | 2 | 2 | 2 | 2.00 | 5 | 2 | 75 |
| 4 | 240 | 420 | 2 | 3 | 3 | 2 | 2 | 2.00 | 5 | 3 | 75 |
| 5 | 200 | 420 | 4 | 3 | 3 | 2 | 2 | 2.00 | 5 | 3 | 75 |
| 6 | 140 | 420 | 13 | 3 | 3 | 2 | 2 | 2.00 | 4 | 3 | 75 |
| 7 | 110 | 420 | 18 | 3 | 3 | 2 | 2 | 2.00 | 3 | 3 | 75 |
| 8 | 180 | 440 | 4 | 3 | 3 | 2 | 2 | 2.00 | 4 | 3 | 75 |
| 9 | 140 | 460 | 4 | 3 | 3 | 2 | 2 | 2.00 | 3 | 3 | 75 |
| 10 | 190 | 420 | 3 | 3 | 3 | 2 | 2 | 2.00 | 4 | 3 | 75 |
| 11 | 200 | 420 | 4 | 3 | 3 | 2 | 2 | 2.30 | 5 | 3 | 50 |

TABLE 1-continued

| Example No. | Z axis strength × $10^{-3}$ (ft-lb) | Pulp freeness of support paper sheet (CSF) | Ash content of support paper sheet (%) | Uniformity of solid print | Ink blotting | Ink drying property | Water resistance of ink images | Color density of ink images | Resistance to spur marks | Resistance to cockling | Gloss |
|---|---|---|---|---|---|---|---|---|---|---|---|
| Comparative Example | | | | | | | | | | | |
| 1 | 50 | 510 | 20 | 3 | 3 | 2 | 2 | 2.00 | 1 | 3 | 75 |
| 2 | 90 | 510 | 10 | 3 | 3 | 2 | 2 | 2.00 | 2 | 3 | 75 |
| 3 | 200 | 420 | 4 | 3 | 3 | 2 | 2 | 1.80 | 5 | 3 | 4 |
| 4 | 200 | 420 | 4 | 1 | 1 | 2 | 1 | 1.20 | 5 | 3 | 5 |
| 5 | — | — | — | 2 | 3 | 1 | 1 | 2.20 | 5 | 3 | 85 |

Table 1 clearly shows that the ink jet recording sheet of the present invention has excellent gloss and ink jet recording aptitude and exhibits a superior resistance to gear or spur marks.

What we claim is:

1. An ink jet recording sheet comprising:

a support paper sheet;

one or more ink receiving layers formed on the support paper sheet, and containing a pigment and a binder resin; and a gloss layer formed on an outermost surface of the ink receiving layers, wherein (1) the support paper sheet contains particles of at least one member selected from the group consisting of calcined kaolin and amorphous silica in a content of 1 to 15% by weight, the calcined kaolin particles having an average particle size of 0.5 to 5 μm and a specific surface area of 5 to 50 $m^2/g$, and the amorphous silica particles having an average particle size of 1 to 50 μm and a specific surface area of 50 to 300 $m^2/g$, in a content of 1 to 15% by weight, and a pulp having a Canadian standard freeness (CSF) of 300 to 450 ml, and exhibits an internal fiber bonding strength of $100\times10^{-3}$ ft-lb or more determined in accordance with TAPPI UM 403;

(2) the gloss layer comprises a resin and fine amorphous silica secondary particles having an average secondary particle size of 10 to 400 nm and each consisting essentially of a plurality of primary particles agglomerated with each other and having an average primary particle size of 3 to 40 nm; and (3) wherein the gloss layer exhibits a gloss of 30% or more, determined at an angle of 75 degrees in accordance with Japanese Industrial Standard Z 8741.

2. The ink jet recording sheet as claimed in claim 1, wherein the gloss layer is formed by coating a coating liquid containing the resin on the one or more ink receiving layers, and, while the resultant coating liquid layer is kept in a wetted condition or after the resultant coating liquid layer is dried and then re-wetted, bringing the wetted or re-wetted coating liquid layer into contact under pressure with a mirror-finished peripheral surface of a heated casting drum, and then drying the cast coating layer.

3. The ink jet recording sheet as claimed in claim 1, wherein the fine amorphous silica secondary particles have an average secondary particle size of 10 nm to 300 nm.

* * * * *